Feb. 20, 1934.  P. M. HALL  1,948,349
CHAIN AND PROCESS OF MANUFACTURE
Filed Feb. 8, 1930

INVENTOR
PRESTON M. HALL
BY
Albert G. Blodgett
ATTORNEY

Patented Feb. 20, 1934

1,948,349

UNITED STATES PATENT OFFICE 1,948,349

CHAIN AND PROCESS OF MANUFACTURE

Preston M. Hall, Worcester, Mass., assignor to American Chain Company, Inc., a corporation of New York Application February 8, 1930. Serial No. 426,847

11 Claims. (Cl. 152—14)

This invention relates to a chain and a process for the manufacture of the same, and particularly to the construction and manufacture of a novel form of chain which has utility in various industrial applications, but which is particularly valuable for use as a non-skid automobile tire chain.

Automobile tire chains as heretofore constructed are subject to rapid wear and breakage, particularly when used on bare ground, and they are not effective in preventing skids and loss of traction when the roadway is covered with a smooth hard icy surface such as frequently occurs in certain localities as a result of a sleet storm. While attempts have been made to overcome these defects, no one, so far as I am aware, has yet produced a tire chain which is an entire commercial success. Some of these constructions involve the use of extra material to provide desirable wearing qualities, but it is found that these chains are too heavy, and because of centrifugal force soon pound themselves to pieces against the roadway. Others soon wear to extensive smooth surfaces which are useless on an icy road, since they merely slide instead of digging into the ice to provide the necessary traction. Still others appear to have desirable features, but the cost of manufacture by any known process is so high as to prohibit commercial exploitation. In order that a tire chain shall be a complete commercial success, it is essential that the construction be light in weight and that it have an extensive surface in contact with the road to ensure a long life of usefulness. This contact surface, however, should be rough and formed by a large number of comparatively small contact areas to prevent the chain from sliding relative to the roadway. Moreover, the chain should be so constructed as to provide shoulders extending in a direction transverse to its length, thereby effectively preventing sidewise skidding of the automobile.

It is accordingly one object of my invention to provide a chain which satisfies such requirements, and particularly one having a large number of projecting portions or protuberances, and which is of light weight and effective to prevent skidding or loss of traction when used as an automobile tire chain.

It is a further object of my invention to provide an automobile tire chain which will have a greater road contacting surface than the ordinary chain links themselves afford, and which will include gripping members projecting outwardly from the side portions of the links for engagement with the roadway.

It is a further object of my invention to provide a novel process by which my improved chain can be simply and economically manufactured, and particularly to provide a process which can be practiced by utilizing apparatus already available without requiring extensive alterations thereto.

With these and other objects in view, as will be apparent to those skilled in the art, my invention resides in the combination of parts and steps of the process set forth in the specification and covered by the claims appended hereto.

In accordance with my invention, I provide a chain in which each side portion of the link is formed with a protuberance of considerable size projecting above the adjacent metal of the link. When the chain is to be used as a tire chain each link is twisted so that the links will lie smoothly against the tire and the protuberances will serve as road grippers to minimize side slippage and provide proper traction for the wheels. While various methods may be utilized in the manufacture of the chain within the scope of my invention, I preferably make the chain link from a single piece of metal bent to the desired shape, so that each link has a single joint. I then heat a considerable portion of the metal adjacent to the joint and opposite thereto, and I force the link together longitudinally, thus welding the joint and upsetting the heated metal to form extensive protuberances. In the ordinary practice of the invention the chain links are preferably assembled in their unwelded form, and the welding and upsetting operations are thereafter performed.

Referring to the drawing illustrating one embodiment of the invention and manner of making the same, and in which like reference numerals indicate like parts:

Figure 1:
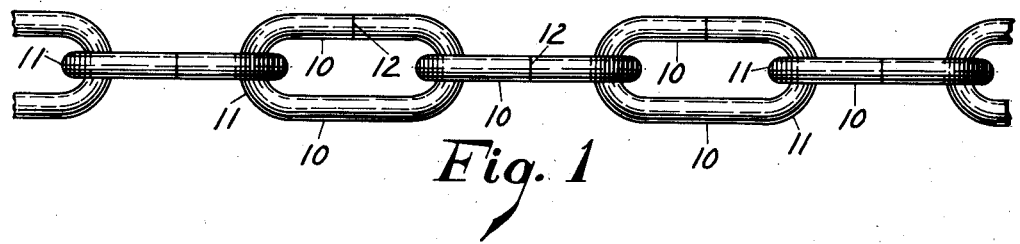
Fig. 1 is a view showing the chain at the completion of the first step of the process of manufacture.

In the practice of my invention I preferably first form an assembled chain as shown in Fig. 1, which is constructed of links each made from a single piece of metal bent to the desired shape. Each link as illustrated comprises two straight side portions 10, and two curved semi-circular end portions 11. The single joint 12, which at this stage of manufacture is unwelded, is preferably located at the center of one of the side portions. The links are made considerably longer than the desired finished size, so as to allow for the shortening caused by the subsequent operations. This form of chain can be very easily and economically manufactured by means of modern machines well known to those skilled in the art. Such machines receive a single continuous cylindrical bar of metal, and shape it into the form illustrated. While this chain will not withstand an excessive load, since it is not welded, it nevertheless has considerable strength and can be handled and transferred to the next operation without any difficulty.

Figure 3:
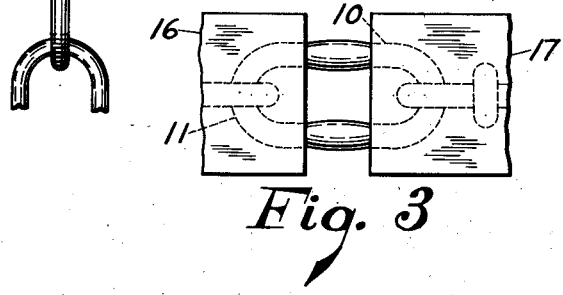
Fig. 3 is a plan view showing the relationship of the various parts at the completion of the welding operation.
Figure 2:
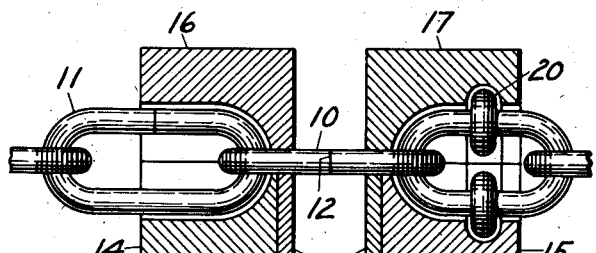
Fig. 2 is an elevation showing the chain inserted in the welding machine, the clamping blocks being shown in section.

The next operation consists in welding the joint in the link, and this is preferably performed on an electric welding machine. The method of supporting the link in the welding machine is illustrated somewhat diagrammatically in Fig. 2, in which the lower clamping blocks are indicated by the numerals 14 and 15, and the upper clamping blocks by the numerals 16 and 17. Clamping blocks of this general type are in common use on electric welding machines, and the method of applying pressure to the clamps and supplying electric current for the heating of the work to a welding temperature is well known to those skilled in the art and it is considered unnecessary to illustrate it in the present case. In the practice of the present invention the clamping blocks are preferably cut out or recessed as shown in Fig. 2 to clear the links adjacent to the link which is to be welded, and they fit closely against the curved portions 11 of the latter link. This provides a firm electrical contact over a considerable area of the link and minimizes the danger of burning the surface of the metal. Ordinarily only the lower blocks 14 and 15 are connected into the electric circuit, and they are spaced apart a considerable distance as shown in Fig. 2 so as to expose a substantial part of both side portions 10 of the links. It will be understood that after the link is clamped in position, an electric current is passed through the lower blocks and the link, and both the exposed parts of the link are quickly brought to a high temperature by the action of the current, though only one of these side portions is to be welded. The blocks 15 and 17 are suitably mounted for horizontal sliding movement, as is common in machines of this type, and as soon as the proper temperature is reached they are moved slightly toward the other set of blocks to the position shown in Fig. 3. This presses together the metal at the joint 12 and forms the weld, at the same time slightly swelling the heated metal in each side portion of the link.

Figure 4:
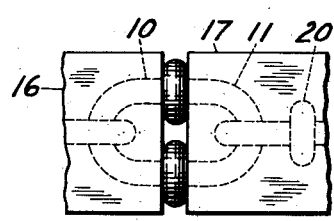
Fig. 4 is a view similar to Fig. 3 showing the completion of the upsetting operation.

The next operation in the practice of my invention consists in upsetting the metal in each side portion of the link to provide extensive protuberances which will be effective to grip the road surface in case the chain is to be used as an anti-skid tire chain, and which will be useful in various other connections. This upsetting operation is preferably performed in the same electric welding machine by continuing the horizontal movement of the clamping blocks 15 and 17 for a substantial distance beyond the point where welding of the joint occurs. By upsetting the metal immediately after the welding, a second heating is avoided and the process is greatly simplified. As shown in Fig. 4, at the completion of the upsetting operation the two sets of clamping blocks are brought very close together, preferably until the distance between them is substantially equal to the diameter of the rod from which the chain is made. This distance determines the thickness of the upset portions of the links. It will be seen that as a result of my process, extensive protuberances or upset portions 20 are formed substantially midway of each side portion 10 of the link, and these protuberances are of comparatively large diameter and coaxial with the adjacent metal of the link. The side faces of the protuberances preferably lie in parallel planes perpendicular to the axis of the corresponding portion 10, and their peripheral surfaces are rounded.

During the upsetting operation, considerable pressure is brought against the face of the clamping blocks by the metal which forms the protuberances 20. The upper blocks 16 and 17 may be made of steel, which is well adapted to withstand this pressure, but the lower blocks 14 and 15, through which the electric current flows, are preferably made of copper because of its superior electrical conductivity. Copper, however, is comparatively soft, and would soon be deformed by the pressure caused by the upsetting. I therefore prefer to mount a steel plate 22 on the face of each lower clamping block to form a hard surface capable of withstanding the pressure.

Figure 5:
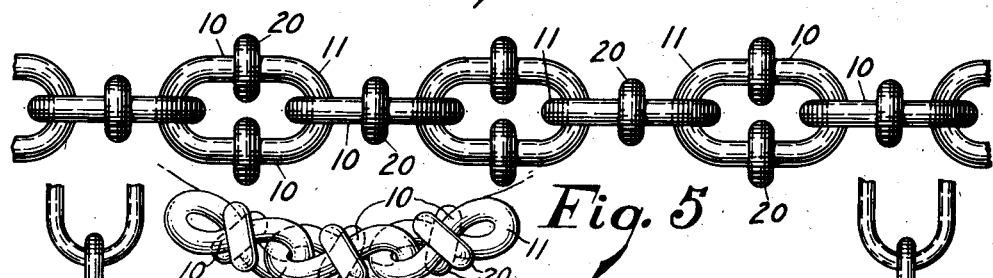
Fig. 5 is a view of the chain after all the links have been both welded and upset.
Figure 7:
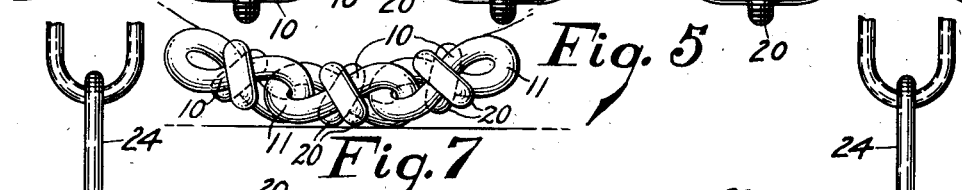
Fig. 7 is a side view of three of the twisted links shown in Fig. 6.

The construction and shape of the chain at the completion of the upsetting operation is illustrated in Fig. 5. Such a chain is useful for many purposes. For example, it might be used in chain hoists of well known construction, provided the sheave grooves were properly recessed to receive the links. In operating a chain hoist it is necessary to grasp a vertically hanging chain with the hands and pull it forcibly downward. The ordinary steel chain presents a comparatively smooth surface, and it is often difficult to obtain a good grip on it, particularly when the hands or the chain are greasy. This difficulty is overcome by my improved form of chain, which provides perpendicular shoulders over which the hands will not readily slip.

Figure 6:
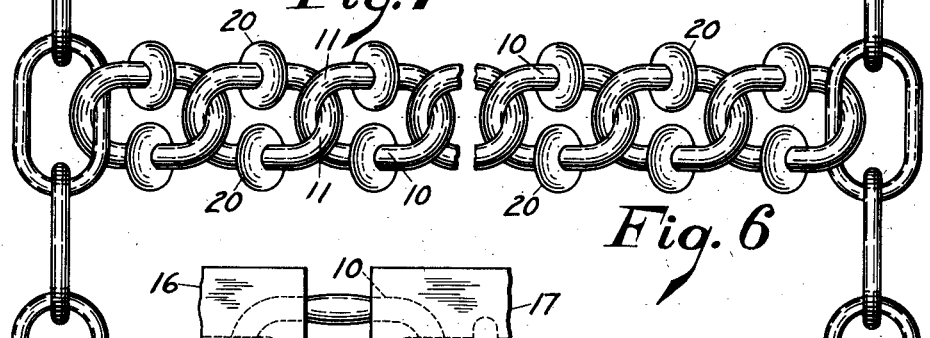
Fig. 6 shows the chain provided with twisted links and arranged to be used as an automobile tire chain.

Such a chain would not be particularly satisfactory for an anti-skid tire chain, however, since it would project too far above the tire and transmit excessive vibration to the automobile. Moreover it would have a small road contact area and would wear rapidly. Hence, in the manufacture of chain for this purpose I add a further step which consists in twisting each link until the central portions of the curved ends 11 of the link lie in planes substantially at right angles to each other. The completed tire chain is illustrated in Fig. 6, in which the numerals 24 indicate the side chains of usual construction which serve to hold my novel cross chain against the tire in a well known manner. The upset protuberances 20 provide wearing surfaces which greatly increase the life of the chain without materially adding to its weight. They also serve to dig into an icy roadway and effectively prevent skidding and loss of traction.

It will be seen from an inspection of Fig. 6 that each link of my improved tire chain is provided with four points for contact with the roadway, as compared with only two points in the ordinary tire chain. These four points are formed by the protuberances 20 and by those portions of the curved ends 11 which overlie the adjacent links. This construction not only greatly increases the life of the chain without appreciably adding to its weight, but it also greatly improves the effectiveness of its grip on the road surface. The sides of the projections 20 form abrupt shoulders transverse to the length of the chain which extend in the direction of travel of the automobile and thus positively resist any tendency of the car to skid sidewise.

Having thus described my invention, what I claim as new and desire to secure by Letters Patent is:

1. An automobile tire chain comprising links each having two side portions and two curved end portions, each side portion being swelled into an extensive protuberance on each side portion which is integral with the metal of the link, each link being twisted to provide four road contacting areas formed by the two protuberances and by the two parts of the curved ends which overlie the adjacent links, the protuberances being shaped to provide abrupt shoulders transverse to the length of the chain which are effective to prevent sidewise skidding of the automobile.

2. A cross-chain for an anti-skid device comprising a plurality of elongated twisted open links having spaced side strands each of which is swelled at a point intermediate its ends into a protuberance consisting of an annulus surrounding said strand, each annulus constituting a road contacting body extending to the plane of contact of the ends of the link with the road.

3. A cross-chain for an anti-skid device comprising a plurality of elongated twisted open links having spaced side strands each of which is swelled at a point intermediate its ends into a protuberance consisting of an annulus surrounding said strand, each annulus constituting a road and tire contacting body extending to the plane of contact of the ends of the link with the road and also to the plane of contact of the said ends with the tire.

4. A cross-chain for an anti-skid device comprising a plurality of elongated twisted open links having substantially straight spaced side strands each of which is swelled at an intermediate point between its ends into a protuberance consisting of an annulus surrounding said strand, each annulus constituting a road and tire contacting body extending to the plane of contact of the ends of the link with the road and also to the plane of contact of the said ends with the tire, the outer periphery of the said annulus being rounded in cross-section with the rounded surface outwardly exposed.

5. A cross-chain for an anti-skid device comprising a plurality of elongated twisted open links having substantially straight spaced side strands each of which is swelled at a point intermediate its ends into a protuberance consisting of an annulus surrounding said strand, each annulus constituting a road contacting body, the contact area of which is substantially flush with the contact areas of the ends of the link.

6. A cross-chain for an anti-skid device comprising a plurality of elongated twisted open links having substantially straight spaced side strands each of which is swelled midway between its ends into a protuberance consisting of an annulus surrounding said strand, each annulus constituting a road contacting body extending to the plane of contact of the ends of the link with the road, the outer periphery of the said annulus being rounded in cross-section with the rounded surface outwardly exposed.

7. A cross-chain for an anti-skid device comprising a plurality of elongated twisted open links having substantially straight spaced side strands each of which is swelled midway between its ends into a protuberance consisting of an annulus surrounding said strand, each annulus constituting a road and tire contacting body extending to the plane of contact of the ends of the link with the road and also to the plane of contact of the said ends with the tire.

8. A cross-chain for an anti-skid device comprising a plurality of elongated twisted open links having substantially straight spaced side strands each of which is swelled midway between its ends into a protuberance consisting of an annulus surrounding said strand, each annulus constituting a road and tire contacting body extending to the plane of contact of the ends of the link with the road and also to the plane of contact of the said ends with the tire, the outer periphery of the said annulus being rounded in cross-section with the rounded surface outwardly exposed.

9. A link for a cross-chain of an anti-skid tire chain, said link being twisted on its longitudinal axis and having spaced side strands each of which is swelled at a point intermediate its ends into a protuberance consisting of an annulus surrounding said strand, each annulus constituting a road and tire contacting body extending to the plane of contact of the ends of the link with the road and also to the plane of contact of the said ends with the tire, the outer periphery of each annulus being rounded in cross-section with the rounded surface outwardly exposed.

10. A link for a cross-chain of an anti-skid tire chain, said link having substantially straight spaced side strands, each of which is swelled at an intermediate point between its ends into a protuberance consisting of an annulus surrounding said strand, each annulus constituting a road and tire contacting body and said link being twisted whereby each annulus and the ends of the link are presented in the same plane of contact with the road and also in the same plane of contact with the tire.

11. An elongated twisted open link for a cross-chain for anti-skid tire chain, said link having spaced side strands, each of which is swelled intermediate its ends into a spheroidal protuberance having oblate faces in parallel planes normal to the longitudinal axis of the strand, the relative proportions of said link and protuberance being such that the ends of the link and the periphery of the protuberance are presented in substantially the same plane of contact with the road and also in substantially the same plane of contact with the tire.

PRESTON M. HALL.